United States Patent [19]

Yokoyama et al.

[11] 4,117,745

[45] Oct. 3, 1978

[54] TORQUE CONVERTER AND PLANETARY GEAR SET THEREFOR

[75] Inventors: Akinori Yokoyama; Mitsuaki Komatsu, both of Yokohama, Japan

[73] Assignee: Kabushiki Kaisha Komatsu Seisakusho, Tokyo, Japan

[21] Appl. No.: 732,149

[22] Filed: Oct. 13, 1976

[30] Foreign Application Priority Data

Oct. 13, 1975 [JP] Japan .................. 50/122448

[51] Int. Cl.$^2$ ............................................. F16H 47/08
[52] U.S. Cl. ............................................. 74/688
[58] Field of Search ............... 74/687, 688, 730, 731, 74/732, 750 R, 325, 677, 718, 720.5; 192/3.27

[56] References Cited

U.S. PATENT DOCUMENTS 3,102,435   9/1963   Shealy .................................. 74/718
3,478,621   11/1969  Johnson et al. ....................... 74/688

*Primary Examiner*—Samuel Scott
*Assistant Examiner*—Frank H. McKenzie, Jr.
*Attorney, Agent, or Firm*—Armstrong, Nikaido, Marmelstein & Kubovcik

[57] ABSTRACT

A torque converter and a planetary gear set therefor, said planetary gear set having two sets of clutches wherein one element among a sun gear, a ring gear and a planetary carrier is connected directly to an input shaft, another element is connected directly to an impeller of said torque converter and the other element is connected to an output shaft via one of said clutches. A power absorption capability of the torque converter may be varied in two stages in order to meet separate demands for engine power which occur during various operating phases of vehicle operation.

20 Claims, 15 Drawing Figures

FIG. 10
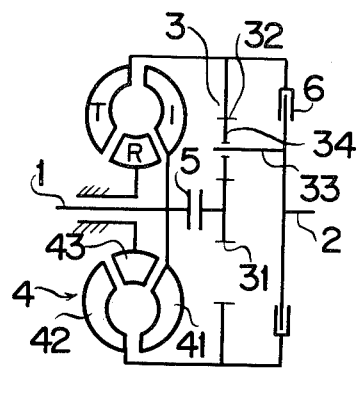
FIG. 11
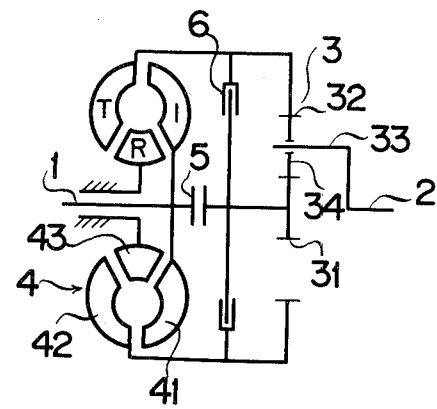
FIG. 12
| Figs 5 & 9 | Single Planetary Gear Set | Double Planetary Gear Set |
|---|---|---|
| (a) | $\dfrac{a}{a+b}$ | $-\dfrac{a}{b-a}$ |
| (b) | $\dfrac{a+b}{b}$ | $\dfrac{b-a}{b}$ |
| (c) | $-\dfrac{a}{b}$ | $\dfrac{a}{b}$ |
| (d) | $\dfrac{b}{a+b}$ | $\dfrac{b}{b-a}$ |
| (e) | $\dfrac{a+b}{a}$ | $-\dfrac{b-a}{a}$ |
| (f) | $-\dfrac{b}{a}$ | $\dfrac{b}{a}$ |

TORQUE CONVERTER AND PLANETARY GEAR SET THEREFOR

BACKGROUND OF THE INVENTION

This invention relates to a speed change gear for use in excavator and loader vehicles such as shovel bulldozers and tyre shovels etc.

In general, the operation of excavator and loader vehicles is broadly classified into the running operation when all the power generated by the prime mover of the vehicle is used for the power required for running, the running and excavating operation when part of the power generated by the power source is used for running and the rest of it is used for driving implement associated therewith for effecting excavation, and the excavating operation when all the power generated by the prime mover is used for driving the implement.

The general characteristic of a power source such as an internal combustion engine is shown by line "A" in FIG. 1 which shows the relationship between the rotational speed of the engine and the torque generated thereby, while line "B" in FIG. 1 shows the input torque characteristic of a torque converter when an excavating machine is in operation wherein the torque consumed by the implement is deducted from the torque generated by the internal combustion engine.

Further, as regards general specific feature of a torque converter, the torque which can be absorbed from a power source by the torque converter is proportional to the square of the rotational speed of the power source. The line "a" in FIG. 1 shows the torque absorption characteristic of a torque converter having a large torque absorption capability, whilst line "b" shows the torque absorption characteristic of a torque converter having a small torque absorption capability.

In the above-mentioned running operation the torque consumed by the implement is zero, and so the torque generated by the power source (shown by the line "A") becomes equal to the torque absorbed by the torque converter. Therefore, when the torque converter having a large torque absorption capability shown by the line "A" is used, the power used for running can be increased as shown by "$T_1$" in FIG. 1.

However, if the implement is used under such condition, the input torque of the torque converter becomes as shown by the line "B" in FIG. 1 so that the relationship of engagement of the power source with the torque converter will change from the state I to II. As a result, the rotational speed of the power source will decrease from $N_1$ to $N_2$ and the rotational speed of the pump for driving the implement is also reduced so that the working speed of the implement is reduced.

If in such case a torque converter having a small torque absorption capability as shown by the line "B" is used, the relationship of engagement of the power source with the torque converter will change from the state I to III so that the rotational speed of the power source will change from $N_1$ to $N_3$ with little reduction, and as a result, the working speed of the implement is not reduced.

For this reason, the working efficiency of the excavator and loader vehicle can be improved by using a torque converter which can provide a large torque absorption capability as shown by the line "A" when the vehicle, is running and develop a small torque absorption capability as shown by the line "B" when the vehicle is running and excavating.

U.S. Pat. No. 3,478,621 to L. E. Johnson et al. is directed to provide such technology wherein either one of the stator and impeller members of a torque converter is divided into two elements so that one element may rotate relative to the other. A control system comprising signal means may be used with the torque converter for generating a variable signal to control the rotation of one element relative to the other.

Thus, the power absorption capability of the torque converter may be accurately controlled within a predetermined range in response to the level of pressure generated by such signal means.

SUMMARY OF THE INVENTION

It is, therefore, an object of the present invention to provide a torque converter and a planetary gear set therefor wherein the power absorption capability of the torque converter may be varied in two stages in order to meet separate demands for engine power which occur during various operating phases of vehicle operation.

Another object of the present invention is to provide a torque converter and a planetary gear set therefor wherein direct driving can be accomplished by engaging clutch means.

It is still another object of the present invention to provide a torque converter and a planetary gear set wherein the power absorption capability of the torque converter can be varied infinitely within a predetermined range by sliding the clutch means.

According to one aspect of the present invention, a transmission system comprises a torque converter and a planetary gear set therefor, said torque converter comprising an impeller, a turbine and a reactor; said planetary gear set comprising input means, a sun gear, a ring gear, a plurality of planet gears, a planetary carrier for connecting said planet gears, an output means, a first clutch connected to said output means, and a second clutch connected to said input means wherein either one of the elements among said sun gear, said ring gear and said planetary carrier is connected directly to said input means, another element is connected directly to said impeller of said torque converter, and the remaining one is connected to said output means via said first clutch.

According to another aspect of the present invention, the transmission system comprises a torque converter and a planetary gear set associated therewith said torque converter comprising an impeller, a turbine and a reactor; said planetary gear set comprising input means, a sun gear, a ring gear, a plurality of planet gears, a planetary carrier for connecting said planet gears, an output means, a first clutch connected to said input means, and a second clutch connected to said output means wherein either one of the elements among said sun gear, said ring gear and said planetary carrier is connected directly to said output means, another is connected directly to said turbine and the remaining one is connected to said input means via said first clutch.

Other objects, features and advantages of the present invention will be readily apparent from the following description taken in conjunction with the accompanying drawings.

BRIEF DESCRIPTION OF THE DRAWINGS

FIG. 10 schematically illustrates another embodiments of the present invention by changing the position of one of the clutches;

FIG. 11 is similar to FIG. 10 but showing still another embodiment of the present invention;

FIG. 12 is a table showing $a_1$ in FIGS. 5(a) to 5(f) and $a_2$ in FIGS. 9(a) to 9(f) wherein "a" represents the number of teeth of sun gear, and "b" represents the number of teeth of ring gear.

DETAILED DESCRIPTION OF THE PREFERRED EMBODIMENTS

Figure 1:
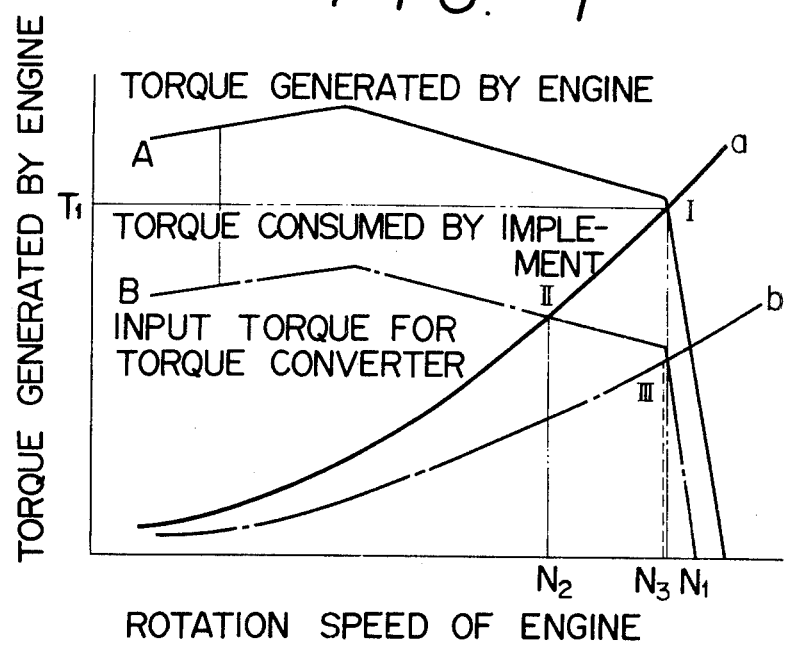
FIG. 1 is a graph showing the relationship between the rotational speed of the prime mover and the torque generated thereby.
Figure 2:
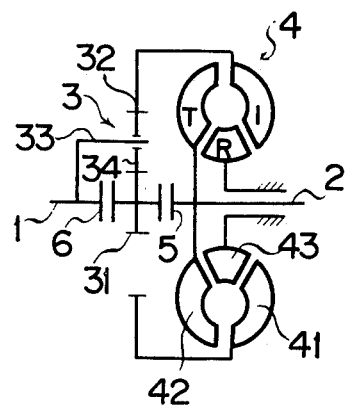
FIG. 2 schematically illustrates a combination of a torque converter and a planetary gear set of the present invention.
Figure 3:
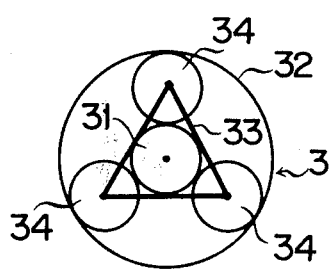
FIG. 3 is a schematic illustration for a planetary gear set of the present invention.
Figure 4:
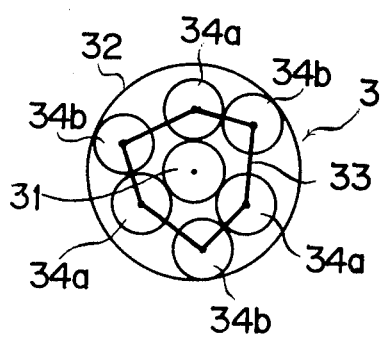
FIG. 4 is similar to FIG. 3 but showing another embodiment of planetary gear set for use with the present invention.

FIG. 2 is a schematic representation of one embodiment of torque converter according to the present invention in which the torque converter is shown in section when it is cut by a plane including an axis of rotation. Reference numeral 1 denotes an input shaft, 2 an output shaft, 3 a planetary gear set, and 4 a torque converter. FIG. 3 is a diagram of planetary gear set 3 viewed axially. Reference numeral 31 denotes a sun gear, 32 a ring gear, 33 a planetary carrier, and 34 planet gears. FIG. 4 is a modification of FIG. 3. Stated more specifically, in FIG. 3 the sun gear 31 is engaged through the planet gears 34 with the ring gear 32, whereas in FIG. 4 sun gear 31 is engaged through first planet gears 34a and second planet gears 34b with a ring gear 32. The arrangement of FIG. 3 will be referred to as single planetary gear set and the arrangement of FIG. 4 will be referred to as double planetary gear set hereinbelow. The torque converter 4 comprises an impeller or impellers 41, a turbine runner 42 and a reactor 43 which is fixedly secured to a housing not shown.

In FIG. 2, the planetary carrier 33 of the planetary gear set 3 is connected to the input shaft 1; the ring gear 32 is connected to the impeller 41 of the torque converter 4; and the sun gear 31 is connected thorugh a clutch 5 to the output shaft 2. Such arrangement wherein either one of the sun gear 31, the ring gear 32 and the planetary carrier 33 of the planetary gear set 3 is connected to the input shaft 1, another is connected to the impeller 41 and the remainder is connected to the output shaft 2 will be referred to as input separation system hereinbelow. FIGS. 5(a) to (f) are schematic representations of the input separation system wherein only the upper half of each of the sections of all the structures of the system cut by a plane including an axis of rotation is shown in diagram for the purpose of simplification of the illustration.

FIG. 5(a) illustrates an embodiment wherein a planetary gear set 3 comprises suitably arranged and intermeshing sun gear, ring gear and planet gears with planetary carrier 33 connected directly to input shaft 1. A sun gear 31 is connected directly to an impeller 41 whereas a ring gear 32 is connected to an output shaft 2 via clutch 5.

FIG. 5(b) illustrates an embodiment wherein ring gear 32 is connected directly to input shaft 1. Planetary carrier 33 is connected directly to impeller 41 whereas sun gear 31 is connected to output shaft 2 via clutch 5.

Figure 5:
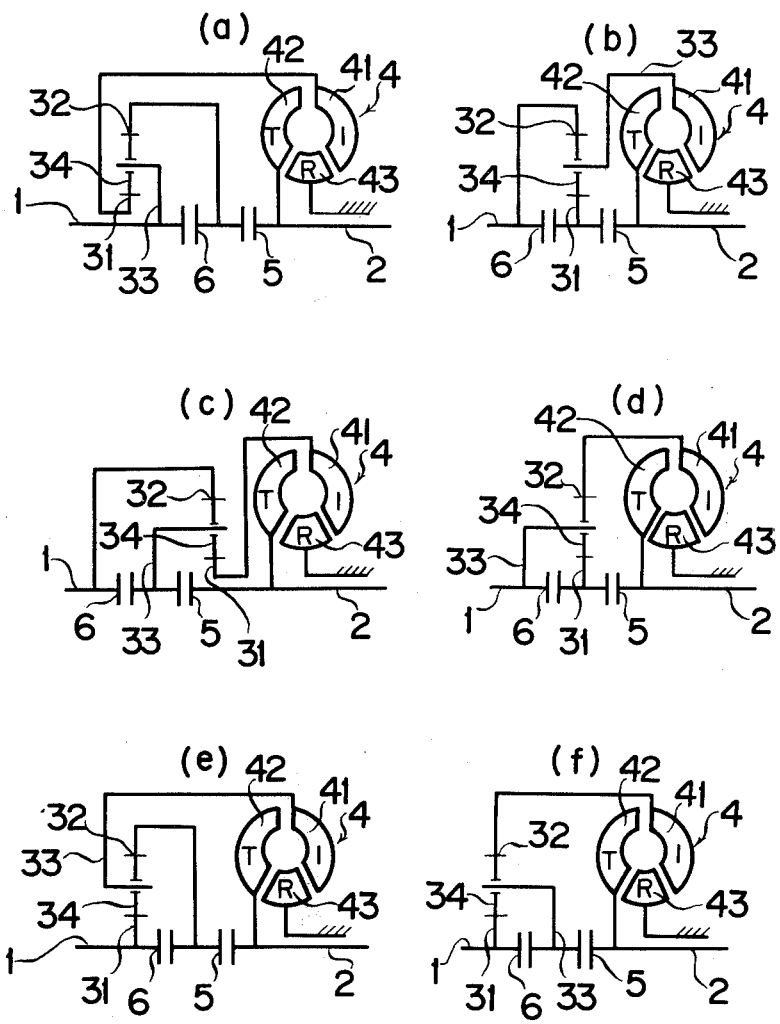
FIGS. 5(a) to 5(f) are similar to FIG. 2 but showing another embodiments of the present invention.
Figure 6:
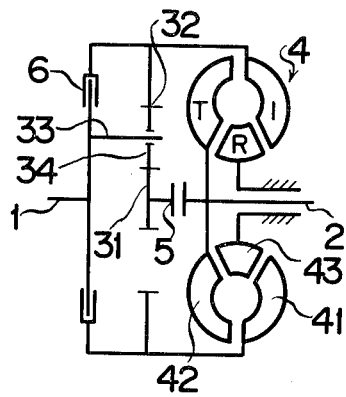
FIG. 6 schematically illustrates another embodiment of the present invention by changing the position of one of the clutches.
Figure 7:
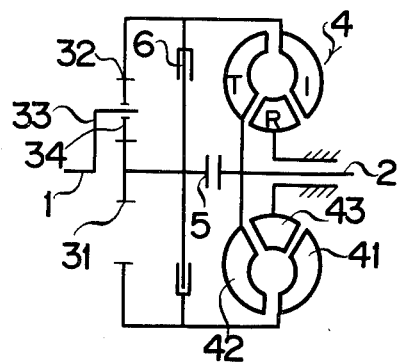
FIG. 7 is similar to FIG. 6 but showing still another embodiment of the present invention.

FIG. 5(c) illustrates another embodiment wherein ring gear 32 is connected directly to input shaft 1. Sun gear 31 is connected directly to impeller 41 whereas planetary carrier 33 is connected to output shaft 2 through clutch 5. FIG. 5(d) illustrates still another embodiment wherein planetary carrier 33 is connected directly to input shaft 1. Ring gear 32 is connected directly to impeller 41 while sun gear 31 is connected to output shaft 2 through clutch 5. FIG. 5(e) illustrates further embodiment wherein sun gear 31 is connected directly to input shaft 1. Planetary carrier 33 is connected directly to impeller 41 while ring gear 32 is connected to output shaft 2 via clutch 5. FIG. 5 (f) illustrates a still further embodiment wherein sun gear 31 is connected directly to input shaft 1. Ring gear 31 is connected directly to impeller 41 whilst planetary carrier 33 is connected to output shaft 2 via clutch 5. In FIG. 2 the arrangement is made such that the sun gear 31 can be connected to the planetary carrier 33 by means of a clutch 6 which can connect the two elements among the three elements, that is; the sun gear 31, the ring gear 32 and the planetary carrier 33. Modifications of the clutch 6 are shown in FIGS. 6 and 7. Modifications of the arrangement of clutch 6 of FIG. 5(a) to 5(f) are available in the forms of FIG. 2, FIG. 6 and FIG. 7. Modifications of the planetary gear set 3 are available in the forms of FIG. 3 and FIG. 4.

Figure 8:
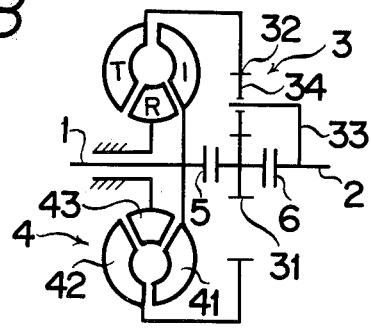
FIG. 8 is a schematic illustration of still another embodiment of the present invention.
Figure 9:
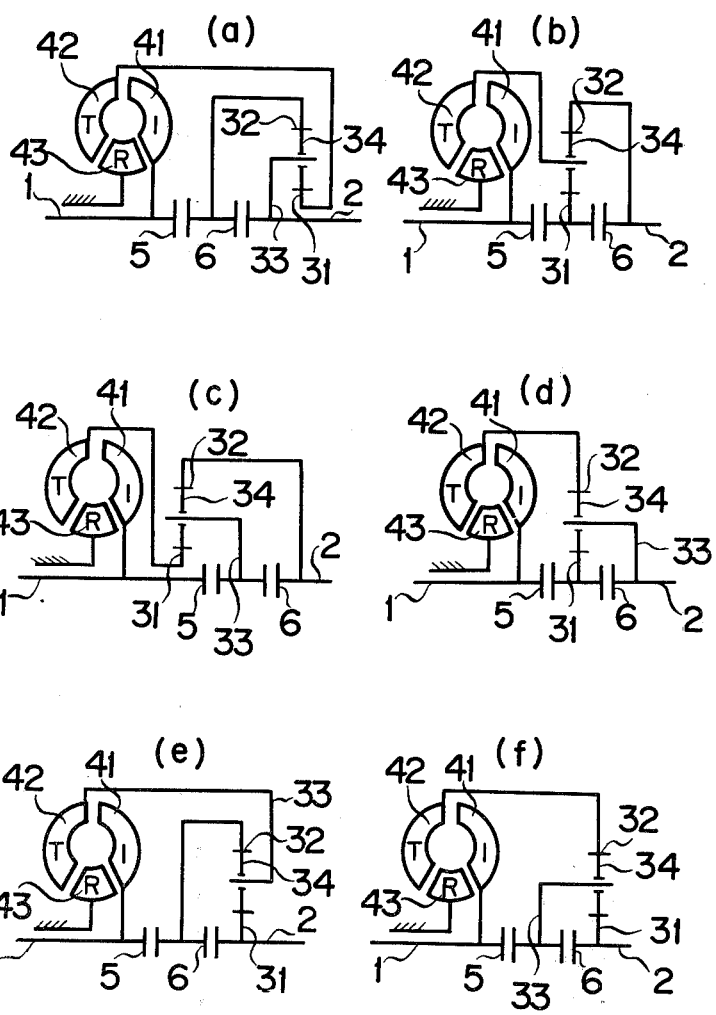
FIGS. 9(a) to 9(f) are similar to FIG. 8 but showing further embodiments of the present invention.

FIG. 8 shows an alternative form of FIG. 2 illustrating another embodiment of the present invention. In this drawing, a planetary gear 33 is connected to an output shaft 2; a ring gear 32 is connected to a turbine runner 42; and a sun gear 31 is connected through a clutch 5 to an input shaft 1. The arrangement made such that either one of the three elements of the planetary gear set 3, that is; the sun gear 31, the ring gear 32 and the planetary carrier 33 is connected to the output shaft 2, another is connected to the turbine runner 42 and the remaining one is connected to the input shaft 1 will be referred to as output separation system hereinbelow. FIGS. 9(a) to (f) are schematic representations of the output separation system wherein only the upper half of each of the sections of all the structures of the system cut by a plane including an axis of rotation is shown in diagram for the purpose of simplification of the illustration. FIG. 9(a) illustrates an embodiment wherein planetary carrier 33 is connected directly to output shaft 2. Sun gear 31 is connected directly to turbine 42 while ring gear 32 is connected to input shaft 1 via clutch 5. FIG. 9(b) illustrates another embodiment wherein ring gear 32 is connected directly to output shaft 2. Planetary carrier 33 is connected directly to turbine 42 while sun gear 31 is connected to input shaft 1 via clutch 5. FIG. 9(c) illustrates still another embodiment wherein ring gear 32 is connected directly to output shaft 2. Sun gear 31 is connected directly to turbine 42 whereas planetary carrier 33 is connected to input shaft 1 via clutch 5. FIG. 9(d) illustrates still another embodiment wherein planetary carrier 33 is connected directly to output shaft 2. Ring gear 32 is connected directly to turbine 42 while sun gear 31 is connected to input shaft 1 through clutch 5. FIG. 9(e) illustrates further embodiment wherein sun gear 31 is connected directly to output shaft 2. Planetary carrier 33 is connected directly to turbine 42 while ring gear 32 is connected to input shaft 1 via clutch 5. FIG. 9(f) illustrates still further embodiment wherein sun gear 31 is connected directly to output shaft 2. Ring gear 32 is connected directly to turbine 42 while planetary carrier 33 is connected to input shaft 1 via clutch 5. In FIG. 8, the arrangement is made such that a sun gear 31 can be connected to a planetary carrier 33 by means of a clutch 6 which can connect the two elements out of the three elements, that is; the sun gear 31, the ring gear 32 and the planetary carrier 33. Modifications of the arrangement of FIG. 8 are shown in FIGS. 10 and 11. As in the case of the input separation system, modifications of FIGS. 8, 10 and 11 on the arrangement of the clutch 6 are available, and modifications of the planetary gear set 3 of FIGS. 6 and 7 are also available.

In the foregoing, all the arrangements of the present invention have been described. The functions of the present invention will now be described hereinbelow.

(1) When both clutches 5 and 6 are engaged together:

With the clutch 6 being connected or engaged, all the sun gear 31, the ring gear 32 and the planetary carrier 33 of the planetary gear set 3 are kept at the same rotational speed. If under such condition the clutch 5 is connected or engaged, the impeller 41 and the turbine runner 42 of the torque converter 4 are kept at the same rotational speed. As a result, the torque absorbed by the impeller 41 is reduced to almost zero in the arrangement of the type in which the impeller 41 is symmetrical to the turbine runner 42, and therefore the power transmitted to the input shaft 1 can be transmitted to the output shaft 2 as it is. Whilst, in the case of the arrangement in which the impeller 41 is non-symmetrical to the turbine runner 42, the power transmitted to the input shaft 1 can be transmitted to the output shaft 2 as it stands by reducing the torque to be absorbed by the impeller 41 to zero by, for example, discharging the fluid within the torus.

(2) When clutch 5 is disengaged (or off) and clutch 6 is engaged (or on):

When the clutch 6 is engaged or connected, all the sun gear 31, the ring gear 32 and the planetary gear 33 of the planetary gear set 3 are kept at the same rotational speed, and in case of the input separation system the rotational speed and the torque transmitted to the input shaft 1 are transmitted to the impeller 41 as they are, whilst in case of the output separation system the rotational speed and torque of the turbine runner 42 are transmitted to the output shaft 2 as they stand.

This means that there is obtained a performance equivalent to that available in the case where in both the input and output separation systems the planetary gear set 3 is eliminated, the input shaft 1 is directly connected to the impeller 41, and the turbine runner 42 is directly connected to the output shaft 42.

(3) When clutch 5 is engaged (or on) and clutch 6 is disengaged (or off):

In this case, the torque converter 4 is influenced by the combination of the planetary gear set 3. Referring to FIG. 2, for example, the torque is transmitted through the planetary carrier 33, the planetary gears 34 and the ring gear 32 to the impeller 41, and then the torque is transmitted to the turbine runner 42 and can be taken out from the output shaft 2.

Accordingly, the performance of the transmission system is given by the following formulas:

In case of input separation system:

speed ratio: $e' = \dfrac{e}{(1-a_1)e + a_1}$ torques ratio: $t' = a_1 t + 1 - a_1$ absorbed torque: $\dfrac{Ti}{Ni^2} = \dfrac{1}{a_1\{(1-a_1)e + a_1\}^2} \times \dfrac{Tp}{Np^2}$ In case of output separation system:

speed ratio: $e' = a_2 e + 1 - a_2$ torque ratio: $t' = \dfrac{t}{(a - a_2)t + a_2}$ absorbed torque: $\dfrac{Ti}{Ni^2} = (1 + \dfrac{1-a_2}{a_2} t) \times \dfrac{Tp}{Np^2}$ wherein;

$Np$, $Tp$: rotational speed and torque of impeller 41
$Nt$, $Tt$: rotational speed and torque of turbine runner 42
$Ni$, $Ti$: rotational speed and torque of input shaft 1
$No$, $To$: rotational speed and torque of output shaft 2
$a_1 = Tp/Ti$
$a_2 = Tt/To$
$e = Nt/Np$
$e' = No/Ni$
$t = Tt/Tp$
$t' = To/Ti$ FIG. 12 shows formulas for calculating $a_1$ in the arrangements of the input separation system shown in FIGS. 5(a) to 5(f), and formulas for calculating $a_2$ in the arrangements of the output separation system shown in FIGS. 9(a) to 9(f). In the table, reference character "a" denotes the number of teeth of the sun gear 31, and "b" the number of teeth of the ring gear 32.

Figure 13:
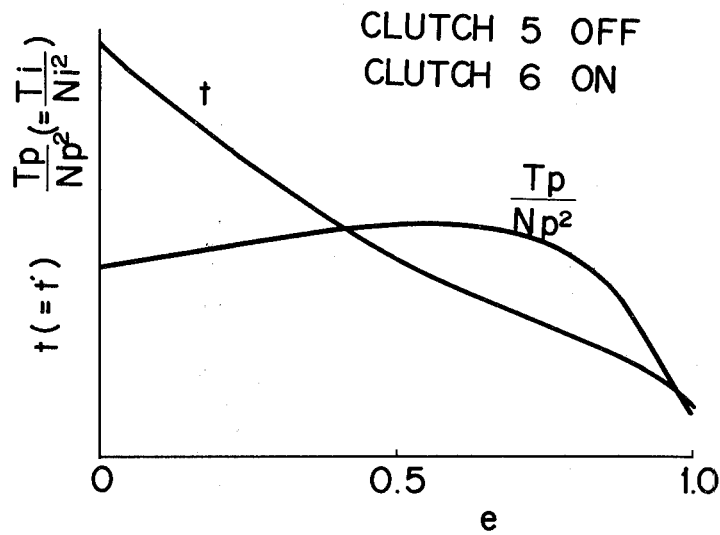
FIGS. 13 to 15 illustrate transmission characteristics relating to power absorption capability when the transmission system of the present invention is in operation.
Figure 14:
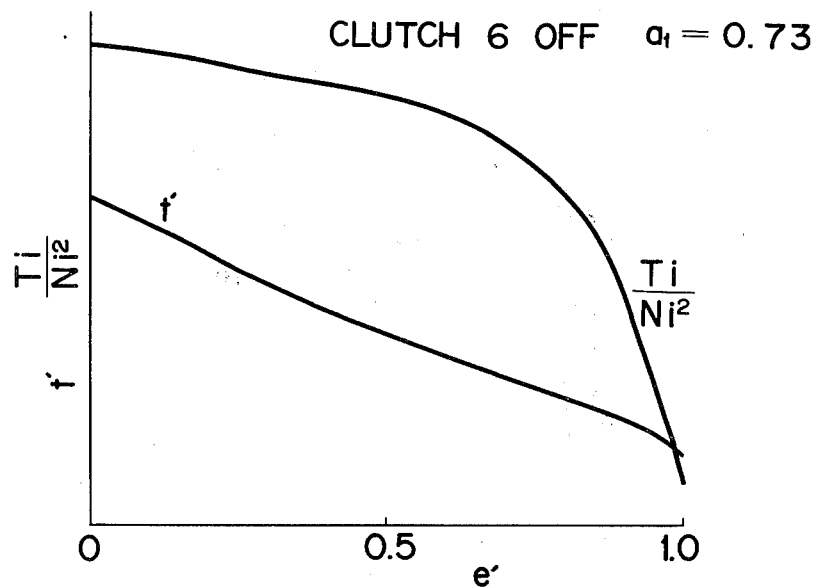
Figure 15:
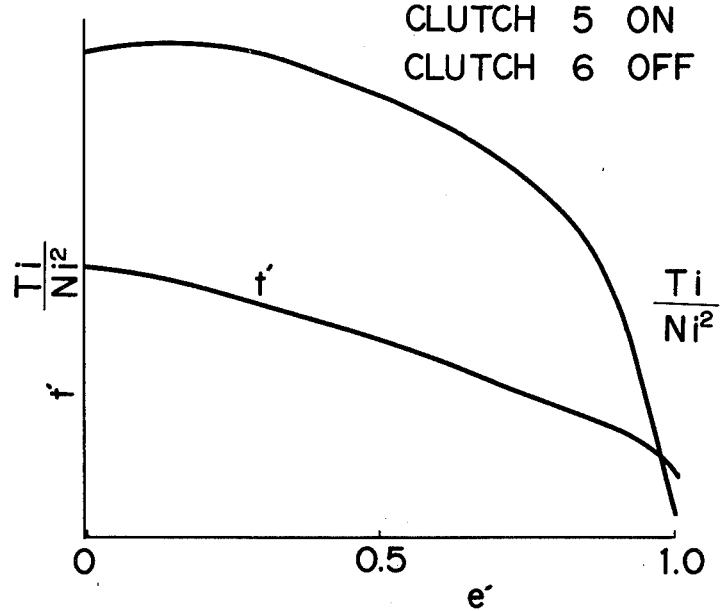

FIGS. 13, 14 and 15 show examples of calculations by the formulas given above. FIG. 13 shows the performance of the torque converter 4 alone; FIG. 14 shows the performance obtained by the arrangement of the input separation system shown in FIG. 5(d); and FIG. 15 shows the performance obtained by the arrangement of the output separation system shown in FIG. 9(d). FIGS. 14 and 15 show examples of comparative calculations where the number of teeth of the planetary gear set 3 is selected so as to make the valves of $Ti/Ni^2$ when $e'$ is zero equal.

(4) When clutch 5 is disengaged (or off) and clutch 6 is also disengaged (or off):

In this cae, neutral condition is obtained.

Further, it is needless to say that relative to the above-mentioned conditions 1, 2, 3 and 4, intermediate conditions or characteristics can be obtained by allowing the clutch 5 or 6 which is under "on" condition to slide properly.

Since various changes and modifications of the invention will occur to and can be made readily by those skilled in the art without departing from the concept of the invention, the invention is not to be taken as limited except by the scope of the appended claims.

We claim:

1. A torque converter and a planetary gear set therefor, said torque converter comprising an impeller, a turbine and a reactor; said planetary gear set comprising input means, a sun gear, a ring gear, a plurality of planet gears, a planetary carrier for connecting said planet gears, an output means, a first clutch connected to said output means, and a second clutch connected to said input means wherein one of the elements among said sun gear, said ring gear and said planetary carrier is connected directly to said input means, another element is connected directly to said impeller of said torque converter, and the other element is connected to said output means via said first clutch.

2. A torque converter and a planetary gear set therefor of claim 1 wherein said planet gears comprise three planet gears, each being adapted to mesh with said sun gear and said ring gear.

3. A torque converter and a planetary gear set therefor of claim 1 wherein said planet gears comprise six planet gears devided into two groups, each group being comprised of three planet gears and wherein one group of said planet gears is adapted to mesh with said sun gear and the other group of said planet gears are in mesh with said ring gear.

4. A torque converter and a planetary gear set therefor of claim 1 wherein said planetary carrier is connected directly to said input means, said ring gear is connected directly to said impeller and said sun gear is connected to said output means via said first clutch.

5. A torque converter and a planetary gear set therefor of claim 1 wherein said planetary carrier is connected directly to said input means, said sun gear is connected directly to said impeller and said ring gear is connected to said output means via said first clutch.

6. A torque converter and a planetary gear set therefor of claim 1 wherein said ring gear is connected directly to said input means, said planetary carrier is connected directly to said impeller and said sun gear is connected to said output means via said first clutch.

7. A torque converter and a planetary gear set therefor of claim 1 wherein said ring gear is connected directly to said input means, said sun gear is connected directly to said impeller and said planetary carrier is connected to said output means via said first clutch.

8. A torque converter and a planetary gear set therefor of claim 1 wherein said planetary carrier is connected directly to said input means, said ring gear is connected directly to said impeller and said sun gear is connected to said output means via said first clutch.

9. A torque converter and a planetary gear set therefor of claim 1 wherein said sun gear is connected directly to said input means, said planetary carrier is connected directly to said impeller and said ring gear is connected to said output means via said first clutch.

10. A torque converter and a planetary gear set therefor of claim 1 wherein said sun gear is connected directly to said input means, said ring gear is connected directly to said impeller and said planetary carrier is connected to said output means via said first clutch.

11. A torque converter and a planetary gear set therefor, said torque converter comprising an impeller, a turbine and a reactor;
said planetary gear set comprising input means, a sun gear, a ring gear, a plurality of planet gears, a planetary carrier for connecting said planet gears, an output means, a first clutch connected to said input means, and a second clutch connected to said output means, said impeller being connected to said input means wherein one of the elements among said sun gear, said ring gear and said planetary carrier is connected directly to said output means, another element is connected directly to said turbine and the remaining one is connected to said input means via said first clutch.

12. A torque converter and a planetary gear set therefor of claim 11 wherein said planet gears comprise three planet gears, each being adapted to mesh with said sun gear and said ring gear.

13. A torque converter and a planetary gear set therefor of claim 11 wherein said planet gears comprise six planet gears devided into two groups, each group being comprised of three planet gears and wherein one group of said planet gears is adapted to mesh with said sun gear and the other group of said planet gears is adapted to mesh with said ring gear.

14. A torque converter and a planetary gear set therefor of claim 11 wherein said planetary carrier is connected directly to said output means, said ring gear is connected directly to said turbine and said sun gear is connected to said input means via said first clutch.

15. A torque converter and a planetary gear set therefor of claim 11 wherein said planetary carrier is connected directly to said output means, said sun gear is connected directly to said turbine and said ring gear is connected to said input means via said first clutch.

16. A torque converter and a planetary gear set therefor of claim 11 wherein said ring gear is connected directly to said output means, said planetary carrier is connected directly to said turbine and said sun gear is connected to said input means via said first clutch.

17. A torque converter and a planetary gear set therefor of claim 11 wherein said ring gear is connected directly to said output means, said sun gear is connected directly to said turbine and said planetary carrier is connected to said input means via said first clutch.

18. A torque converter and a planetary gear set therefor of claim 11 wherein said planetary carrier is connected directly to said output means, said ring gear is connected directly to said turbine and said sun gear is connected to said input means via said first clutch.

19. A torque converter and a planetary gear set therefor of claim 11 wherein said sun gear is connected directly to said output means, said planetary carrier is connected directly to said turbine and said ring gear is connected to said input means via said first clutch.

20. A torque converter and a planetary gear set therefor of claim 11 wherein said sun gear is connected directly to said output means, said ring gear is connected directly to said turbine and said planetary carrier is connected to said input means via said first clutch.

* * * * *